United States Patent [19]

Laine

[11] 4,203,749
[45] May 20, 1980

[54] METHOD OF PRESSING AND PRESSING MACHINE FOR HOLLOW GLASSWARE

[75] Inventor: Jean-Claude Laine, Meung sur Loire, France

[73] Assignee: Saint-Gobain Industries, Neuilly-sur-Seine, France

[21] Appl. No.: 934,403

[22] Filed: Aug. 17, 1978

[30] Foreign Application Priority Data

Aug. 24, 1977 [FR] France ................. 77 25860

[51] Int. Cl.² ............................................ C03B 11/16
[52] U.S. Cl. ............................................ 65/68; 65/81; 65/167; 65/318; 65/355
[58] Field of Search ................. 65/167, 318, 319, 321, 65/323, 355, 68, 81

[56] References Cited

U.S. PATENT DOCUMENTS

| 2,722,084 | 11/1955 | Winder | 65/167 |
| 2,783,591 | 3/1957 | Johnson | 65/251 |
| 3,337,325 | 8/1967 | Bittner et al. | 65/318 |
| 3,362,807 | 1/1968 | Wiley | 65/167 X |
| 3,390,974 | 7/1968 | Parsons et al. | 65/323 |
| 3,953,187 | 4/1976 | James | 65/318 X |

FOREIGN PATENT DOCUMENTS 1371721 10/1963 France.
1391860 2/1965 France.
2299280 10/1975 France.
47-35525 9/1972 Japan.

Primary Examiner—Arthur D. Kellogg
Attorney, Agent, or Firm—Pennie & Edmonds

[57] ABSTRACT

An improved pressing machine for hollow glassware comprising advancing means for advancing molds through a series of advance steps for molding one range of size of articles and for advancing the molds through advance steps of other distances for molding articles of other size ranges. For each size range of articles to be produced, the machine includes a group of glass discharging devices discharging molten glass into each of the molds and a plurality of pressing devices for molding the glass within the molds. These devices are spaced relative to each other by distances equal to the distance of advance of the molds from station to station. The pressing machine further includes a molding plate having an adaptor for mounting molds of different sizes depending on which range of sized articles are to be produced.

17 Claims, 7 Drawing Figures

METHOD OF PRESSING AND PRESSING MACHINE FOR HOLLOW GLASSWARE

BACKGROUND OF THE INVENTION

1. Field of the Invention

The present invention concerns the molding of articles such as hollow glassware. More particularly, it concerns a new glass making machine capable of executing a wide range of articles.

2. Description of the Prior Art

Glass pressing machines used in making hollow glassware permit execution of a generally narrow range of molded articles. Thus, there are distinguishable pressing machines for small articles, for example articles of about 40 to 150 mm in diameter, pressing machines for medium-sized articles, for example articles of about 150 to 260 mm in diameter, and machines adapted to the production of large articles, for example articles exceeding 260 mm in size.

For producing small or medium-sized articles, pressing machines have one or a plurality (generally two) of pressing devices with an equal number of dies. The devices are pneumatically controlled by simultaneous operation to permit a relatively high rate of production. For example, a pressing machine having double pressing devices can produce on the order of 60–50-mm tumblers per minute.

Known pneumatically controlled machines display a number of disadvantages. In addition to their specialization and their limitation to a given and relatively narrow range of articles, they have a major drawback, due essentially to their pneumatic control. Such control mechanisms permit no control over the travel of the die or dies attached at the ends of the rams of the pressing devices. Thus, the impact of the dies with the mass of glass to be formed, called the parison, approaches hammering. This results in defects in appearance of the molded article such as distortion, folds, etc.

For producing larger articles, for example about 300 mm in diameter, the pressing machines used may have either pneumatic or hydraulic control devices. Where the control mechanism is pneumatic, the pressing machine is equipped with a toggle mechanism, i.e., a device making it possible to increase the pressure of the die during formation of the article. In addition to the above-mentioned drawbacks inherent in the single pneumatic control, such toggle machines have the disadvantage of requiring a very bulky pressing device due to the presence of the toggle mechanism. This is the reason why these machines generally include only one pressing device.

Where, as an alternative, the die in the pressing machine is hydraulically controlled, a greater stamping force is imparted to the die than can be with a pneumatic operation. This permits elimination of the toggle mechanism. To the gain in space obtained by getting rid of the toggle mechanism are added other advantages, such as the possibility of controlling the speed of stamping during formation of the article in the mold, less noisy stamping, etc. A machine with a hydraulic control of this type is described in U.S. Pat. No. 3,953,187. The articles produced by these hydraulic pressing machines are generally of good quality. The essential disadvantage of these machines, in general, is the slow rate of production of articles.

SUMMARY OF THE INVENTION

The present invention eliminates the disadvantages mentioned above with a new machine permitting execution of a wide range of articles with a high rate of production and in a very good quality of articles. The invention relates to an improved construction of a pressing machine having a revolving circular molding plate having a plurality of molds, a plurality of glass discharging devices for discharging molten glass into the molds, a plurality of pressing devices for molding the glass into an article and a plurality of cooling devices and stripping devices distributed circularly above the plate for, respectively, cooling and removing the formed articles from the machine. The improved machine is characterized in that it includes advancing means for advancing the plate, with the molds carried thereby, in incremental fashion, through advance steps of different magnitude. The pressing devices as well as the glass discharging devices are distributed into a plurality of groups, each of the groups being used for the fabrication of a given size range of articles. The discharging devices belonging to any one group are displaced with respect to the pressing devices belonging to that same group by a distance equal to an advance step of the molding plate when the machine is set to operate on that group.

For reasons of the bulk due to the plurality of devices borne by the machine, and also of bulk of the machine itself, embodiments will generally be limited to machines having two or three groups of discharging and pressing devices, this according to the extent of the range of articles to be executed. Each of the groups will include one or a plurality, generally two or three, of equivalent devices.

The revolving molding plate of the pressing machine supports adaptors for all the categories of molds. The adaptors are positioned equidistant from one another and are distributed uniformly on the periphery of the plate. The adaptors may be separate elements assembled into a single piece called a crown. Each adaptor has a plurality of groups of holes for positioning the molds. For example, an adaptor may have three positioning holes distributed into a central hole and two holes on the periphery, symmetrical with respect to the central hole. At the time of a change in production, these adaptors for all the molds facilitate the switch from one group of molds to another, by permitting rapid and precise positioning of the molds.

In a preferred embodiment of the invention, the hydraulic mechanism controlling the pressing devices is designed such as to impart a stamping motion to the dies of the pressing devices having the following sequence: controlled rapid descent of approach of the die to the parison, controlled slow descent of the die for pressing, holding of the die at the end of travel under pressure to provide for "glazing," followed by a decompression while keeping the die in low position, and finally rapid ascent. Each of the die motions is controlled and its duration determined in accordance with the article to be molded. The essential advantage of the operation of decompression in low position of the dies in the mold is to keep the formed article from sticking to the die when the latter ascends.

In one form of embodiment of the pressing machine, the step-by-step motion of the revolving plate bearing the molds is effected by a hydraulic jack mechanism. Each of the hydraulic jack transmits to the plate a motion of rotation corresponding to a given advance step for moving the article from one operating station to the next. Thus, if the plate has two different modes of operation, one including an advance step of a predetermined arcuate distance and another with an advance step of twice the predetermined distance, the hydraulic device securing rotation of the plate will comprise two hydraulic jacks.

DETAILED DESCRIPTION OF THE PREFERRED EMBODIMENT

In accordance with the teachings of the present invention, the pressing machine comprises a molding plate containing 16 adaptors which together form a crown and on which it is possible to mount 32, 16 or 8 molds according to the size of the articles to be produced. Four discharging devices of four pressing devices are provided and divided into two groups. One group includes two discharging devices and two pressing devices for the production of small articles and the second group includes two different discharging devices and two different pressing devices for the production of medium-sized and large articles. Cooling devices and stripping devices likewise divided into two groups are also provided. In the production of very large articles, every other adaptor will bear a mold for reasons of bulk. In the latter production, the machine will work on a single parison. A single discharging device and a single pressing device will be used and selected indifferently from among the two discharging devices and their corresponding pressing devices which are used for the production of medium-sized articles. The machine will likewise be able to work on a single parison for producing large articles for which the duration of cooling is significant. In such production each of the adaptors mounted on the plate of the machine will hold a mold and the advance motion of the plate will be by a small step.

Figure 1:
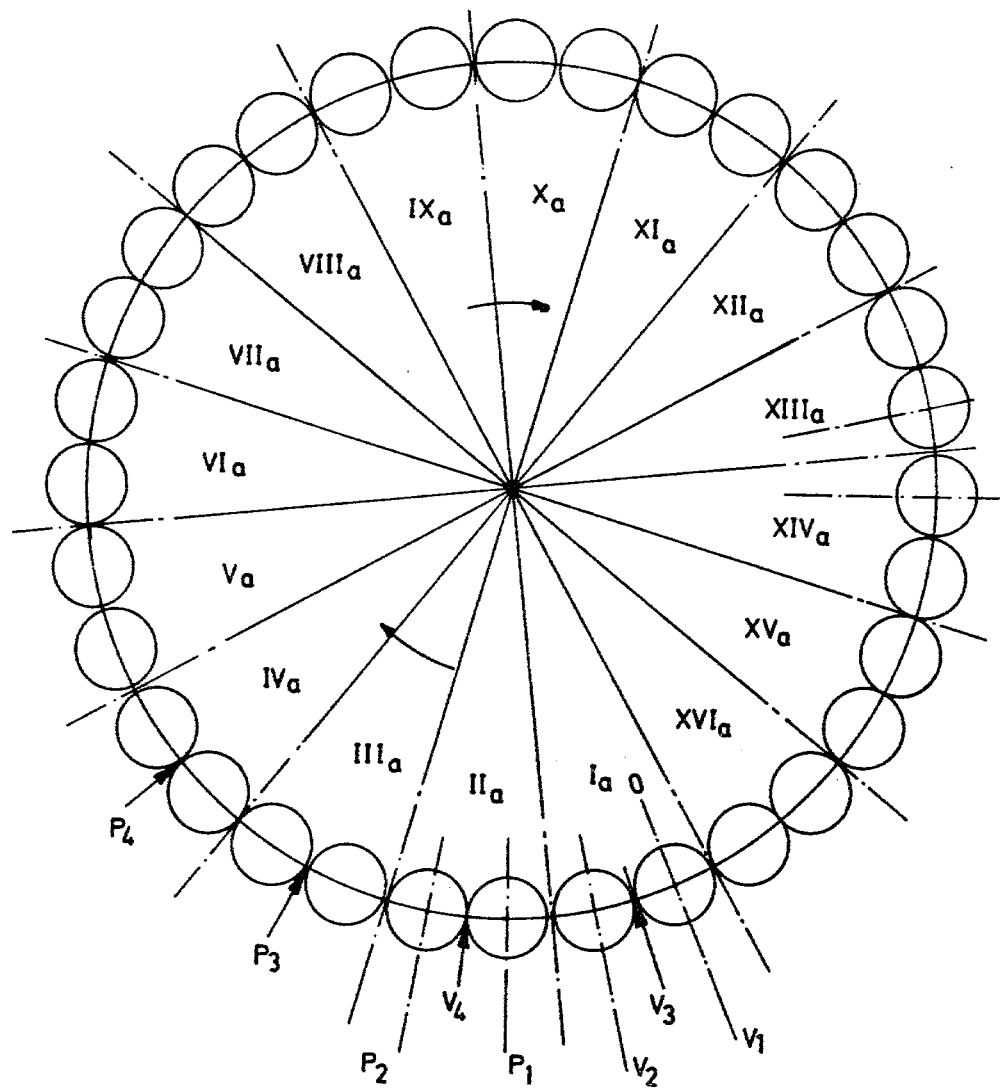
FIG. 1 is a diagram representing the position of the molds on the revolving molding plate of the machine in the production of small articles using 32 molds, as well as the position of the discharging and pressing devices in such a production run.

FIG. 1 shows the location of the two discharging devices $V_1$ and $V_2$ and the two pressing devices $P_1$ and $P_2$ of the one group used in the production of small articles with 32 molds. The 32 molds are regularly distributed in the 16 adaptors on the periphery of the revolving molding plate. Each adaptor has a position corresponding to a given work station; and in this embodiment, the machine has 16 fixed work stations. These stations are designated $Ia$ through $XVIa$ and represented in FIG. 1 by sectors of a circle. With this embodiment, the step advance of the molding plate from station to station will each be 1/16 of a complete revolution of the plate.

The work station $Ia$ is the one where discharge of the molten parison is effected. It comprises two discharging devices $V_1$ and $V_2$. Each of the discharging devices of conventional construction comprises a channel placed under the distributor of molten glass. The end of the channel reaches just above the mold and through it flows a given mass of glass having a suitable temperature and viscosity. The mass as deposited in the mold is called the parison.

The work station $IIa$ is the station at which pressing is effected. This station comprises two pressing devices $P_1$ and $P_2$. These two devices are displaced with respect to the corresponding discharging devices $V_1$ and $V_2$ by the incremental distance of a single advance step of the plate. As defined in terms of a fraction of revolution of the plate from one work station to the next, this spacing is equal to 1/16 of a revolution. Each pressing device includes a die whose external shape reproduces the internal shape of the article to be molded, a hydraulic jack mechanism connected to the die for actuating the die, and a retainer whose role is generally threefold: (1) centering the die at the end of its travel, (2) limiting the flow of the glass compressed between the die and the mold, and (3) holding the molded article in the mold on separation of the die.

The following stations, designated $IIIa$ and $XIIa$, are cooling stations. At these stations, the fabricated article is cooled, by ambient air or by blown air, from cooling devices so that it can be removed from the mold by suitable stripping devices located at stripping stations $XIIIa$ and $XIVa$.

To avoid breaking the rhythm of production in case of difficulties at the stripping stations, as for example, as might occur due to an article sticking tightly to the mold, one or two forced stripping stations are provided between the stripping stations $XIIIa$ and $XIVa$ and the discharging station $Ia$. It is also in these latter stations that lubrication is effected if required by the type of article. During production, passage from one station to the next is effected by a rotation of the plate bearing the molds by 1/16 of a revolution in clockwise direction. This is the smallest advance step of the machine. As more fully explained below, an advance step of the plate of ⅛ of a revolution is also provided for.

Figure 2:
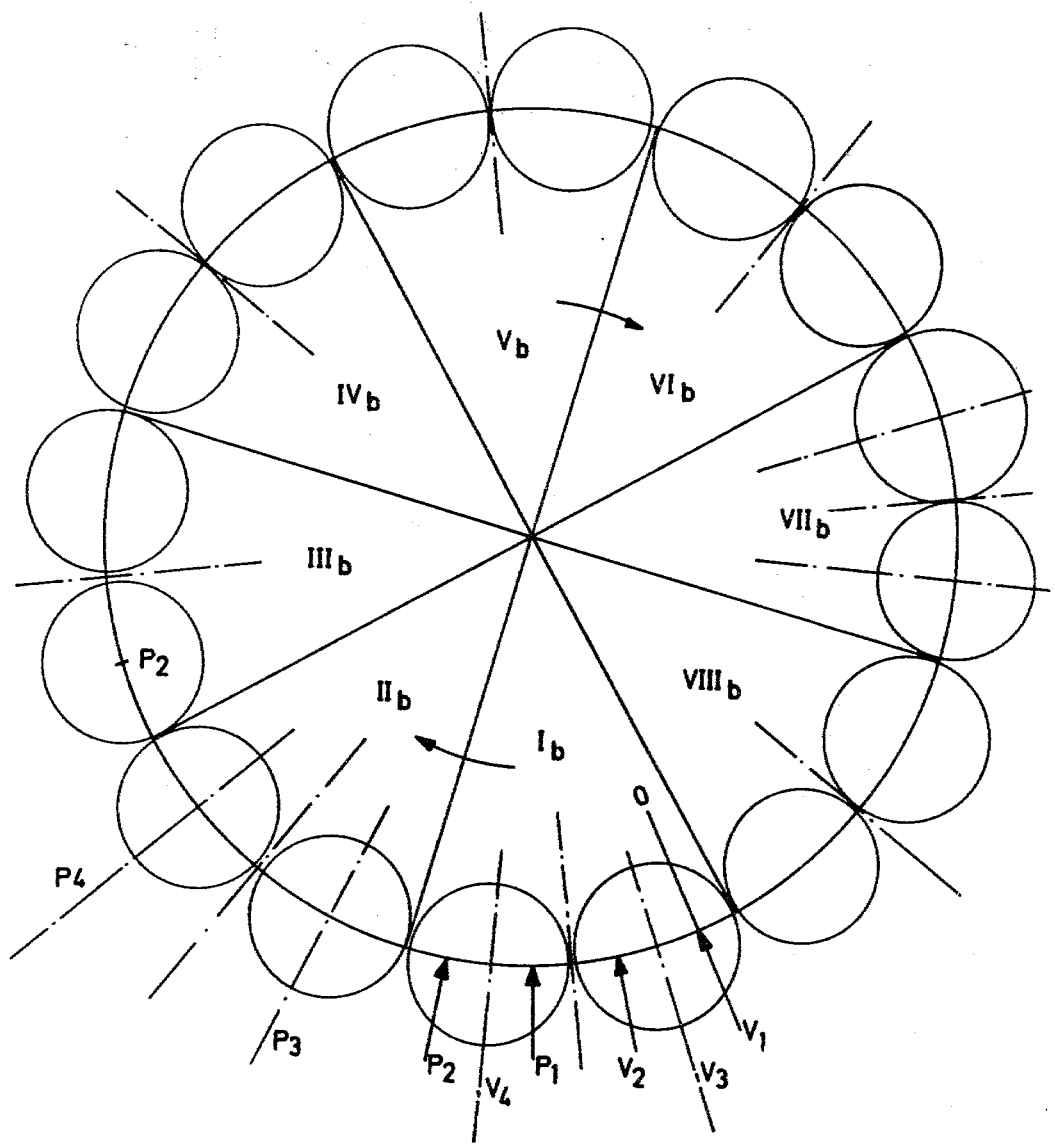
FIG. 2 is a similar diagram to FIG. 1 for the production of medium-sized articles with 16 molds.

As indicated in FIG. 1 and more clearly shown in FIG. 2, two discharging devices $V_3$ and $V_4$, similar to devices $V_1$ and $V_2$ are located at stations $Ia$ and $IIa$. These devices belong to a second group and are used in the production of medium-sized articles, for example articles having a diameter of from 150 to 260 mm. The central plane of symmetry of these two discharging devices is displaced from the central plane of symmetry of the discharging devices $V_1$ and $V_2$ by 1/32 of a revolution. The pressing devices $P_3$ and $P_4$ used in the production of medium-sized articles are located at stations $IIa$ and $IVa$.

FIG. 2 represents a location diagram of the various pressing and discharging devices which are used in the fabrication of medium-sized articles.

In the production of medium-sized articles, the molding plate of the machine supports 16 molds regularly distributed on the periphery of the plate. Each of the molds is mounted on an adaptor. The 16 adaptors pass through 8 work stations. Passage from one station to the next is effected by an advance step of rotation of the plate of ⅛ of a revolution.

At the work station Ib the second group of two discharging devices $V_3$ and $V_4$ are located. These discharging devices are similar in structure to the aforementioned devices $V_1$ and $V_2$ of the first group. The station Ib covers the two stations Ia and IIa of a production run of small articles.

At the following station IIb, two pressing devices $P_3$ and $P_4$ of the second group are located. They each comprise elements similar to devices $P_1$ and $P_2$ of the first group but with more powerful hydraulic jack mechanisms. For example, hydraulic jacks 100 mm in diameter may be provided for the piston and 70 mm in diameter for the rod for the pressing devices $P_3$ and $P_4$, while the jacks of the pressing devices $P_1$ and $P_2$ may have a diameter of 80 mm for the piston and of 50 mm for the rod.

The following stations IIIb and IVb are cooling stations, corresponding to the cooling stations IIIa to XIIa. The station VIIb is devoted to stripping and comprises two stripping devices similar to the devices used in the production of small articles. Likewise found is a following forced stripping and lubrication station VIIIb.

The same discharging and pressing stations which are used for medium-sized articles are used for the production of larger articles, over 260 mm in diameter. Articles of this size have a considerable cooling cycle, and the machine will therefore generally operate on a single parison. In other words, a single discharging device $V_3$ or $V_4$ and the pressing device $P_3$ or $P_4$ will be used. Preferably $V_4$ and $P_3$ will be used to avoid an idle period between discharge of the parison and pressing. The plate will bear 16 molds, each mounted in an adaptor. Advance of the plate will be at the smallest 1/16 advance step which will increase the number of cooling stations.

For the largest-sized articles, the space occupied by the molds is significant. Therefore, only every other of the 16 adaptors will support a mold. Pressing will be done on a single parison, i.e., a single discharging device $V_3$ or $V_4$ and the corresponding pressing devices will operate. In this case, the advance of the plate will be a large advance step of rotation, or ⅛ of a revolution.

In a machine pursuant to the invention, with four discharging devices $V_1$, $V_2$, $V_3$ and $V_4$ and four pressing devices $P_1$, $P_2$, $P_3$ and $P_4$ divided into two groups, the position of the various devices is related to the advance step of rotation of the molding plate. Thus, if a discharging device belonging to a first group is taken as reference, the second discharging device of that group will be displaced by a distance equal to 2n p/4 of a revolution of the molding plate with n being a whole number and p being the advance step of rotation of the plate corresponding to passage from one work station to the next as expressed in terms of a fraction of revolution of the plate. The two pressing devices will likewise be displaced with respect to the reference discharging device by a distance equal to 2n p/4 of a revolution of the molding plate and by a distance equal to mp of a revolution of the molding plate with respect to their corresponding discharging device, with integer m generally equal to 1.

Thus, with the machine set for the production of small articles, using 32 molds and having an advance step of 1/16 of a revolution of the plate, p will equal 1/16 and 2n p/4 will equal n/32. Accordingly, the distance between the reference distributing device $V_1$ and the remaining devices of this same group can be calculated as follows:

| Devices | n | Spacing in Revolutions |
|---|---|---|
| $V_1$-$V_2$ | 1 | 1/32 |
| $V_1$-$P_1$ | 2 | 1/16 |
| $V_1$-$P_2$ | 3 | 3/32 |

Also, the spacing between the discharging devices and their corresponding pressing devices can be calculated, using the expression mp, to be a distance equal to 1/16 of a revolution, where m=1 and p=1/16.

The spacing between the pressing devices $P_3$ and $P_4$ and distributing devices $V_3$ and $V_4$ of the second group of devices from the reference distributing device $V_1$ of the first group can also be calculated. More particularly, the two discharging devices $V_3$, $V_4$ used in the production of medium and large-sized articles, as well as the two corresponding pressing devices $P_3$, $P_4$ are displaced from the distributing device $V_1$ by a distance equal to (4n+1) p/4 of a revolution of the molding plate. Also, the two pressing devices for medium-sized and large articles are likewise displaced by a distance equal to 2qp of a revolution of the molding plate from their corresponding discharging devices, with q being an integer and generally equal to 1.

Thus, using p=1/16, (4n+1) p/4=(4n+1)/64, the distances between the various devices can be calculated as follows:

| Devices | n | Spacing in Revolutions |
|---|---|---|
| $V_1$-$V_3$ | 0 | 1/64 |
| $V_1$-$V_4$ | 1 | 5/64 |
| $V_1$-$P_3$ | 2 | 9/64 |
| $V_1$-$P_4$ | 3 | 13/64 |

Also, using the expression 2qp, where q=1 and p=1/16, the spacing between the pressing devices $P_3$, $P_4$ and the corresponding distributing devices $V_3$, $V_4$ can be determined to be equal to ⅛ of a revolution of the molding plate.

An important feature of the new pressing machine is the use of adaptors for all the molds. This will now be described with reference to FIGS. 3, 4 and 5.

Figure 3:
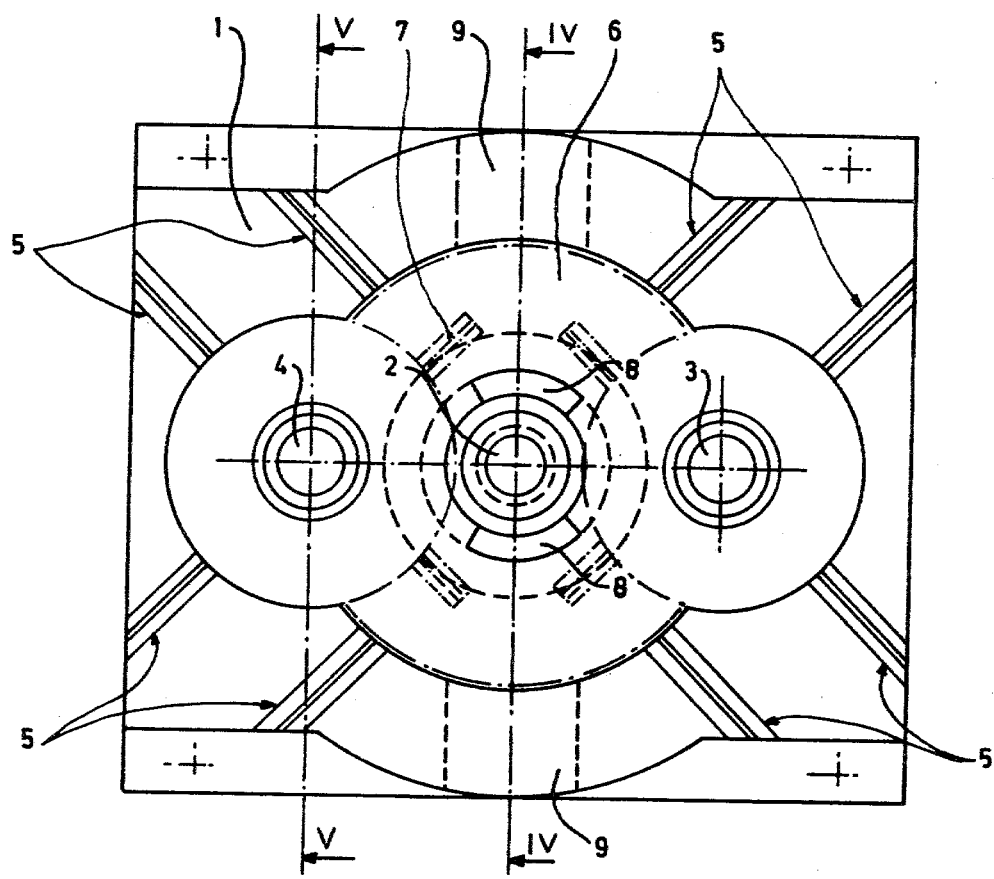
FIG. 3 is a plan view of an adaptor for various molds.

FIG. 3 is a plan view of an adaptor pursuant to the invention. In this view, the adaptor is shown without a mold. It has a body 1 pierced by a central cylindrical hole 2 and by two symmetrical peripheral holes 3 and 4. These holes are the vertical positioning axes for the various molds; the hole 2 is used for the positioning of a mold for medium-sized or large articles, while the holes 3 and 4 permit the positioning of molds for small articles.

The body of the adaptor has a plurality of flat-bottomed V-shaped grooves 5. These grooves, regularly distributed about the holes 2, 3 and 4, are used for the precise centering of the molds. For centering the small molds, in addition to the grooves 5, there is provided a supplementary piece 6, represented by the chain-dotted lines in FIG. 3, mounted and centered in the hole 2 and which has four grooves 7. The grooves 5 and 7 are adapted to receive four complementary shaped male retainers attached to the bottom of each mold, thus securing perfect centering thereof. The adaptor has other orifices 8 and 9 for the admission and outlet of cooling fluid for the molds. The cooling fluid is generally air under pressure.

Figure 4:
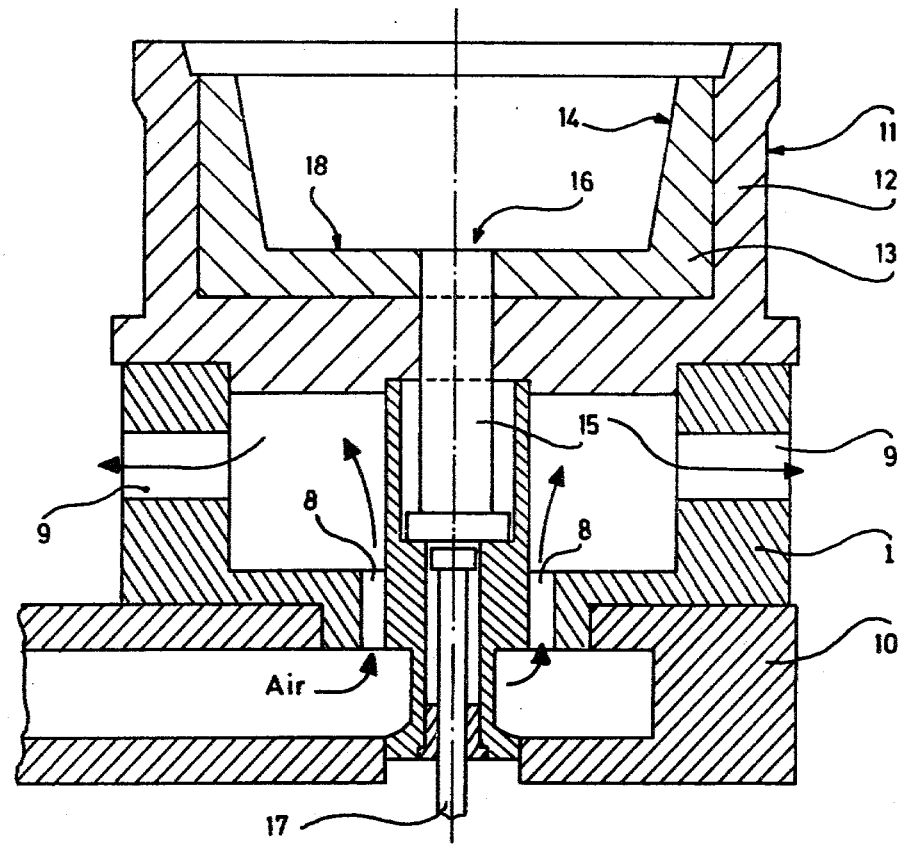
FIG. 4 is a sectional view, along line IV—IV of FIG. 3 of the adaptor mounting a mold for medium-sized articles.

FIG. 4 shows, in cross-section, the adaptor 1 with a mold 11 axially aligned with the central hole 2. The adaptor is mounted on the molding plate 10 of the press and does not use the supplementary piece 6 for aligning the mold 11. Instead, the four grooves 5 extending toward the hole 2 are relied upon for this. The mold 11 is used for the production of medium-sized articles and comprises an outer body 12 and an inner piece 13 the internal surface 14 of which reproduces the external shape of the article to be molded. The mold also includes a movable axial cylinder 15, the upper end 16 of which constitutes a part of the bottom of the mold. This axial cylinder serves for stripping the article from the mold and is actuated by the drive rod 17 having a given travel, for example on the order of 200 mm. The inner bottom of the mold 18 is situated at a given level with relation to the level of the plate 10 of the press and is constant regardless of the mold used, thus facilitating adjustment of the travel of the die. FIG. 4 also shows the inlets 8 and outlets 9, mentioned above, for the cooling fluid for the molds.

Figure 5:
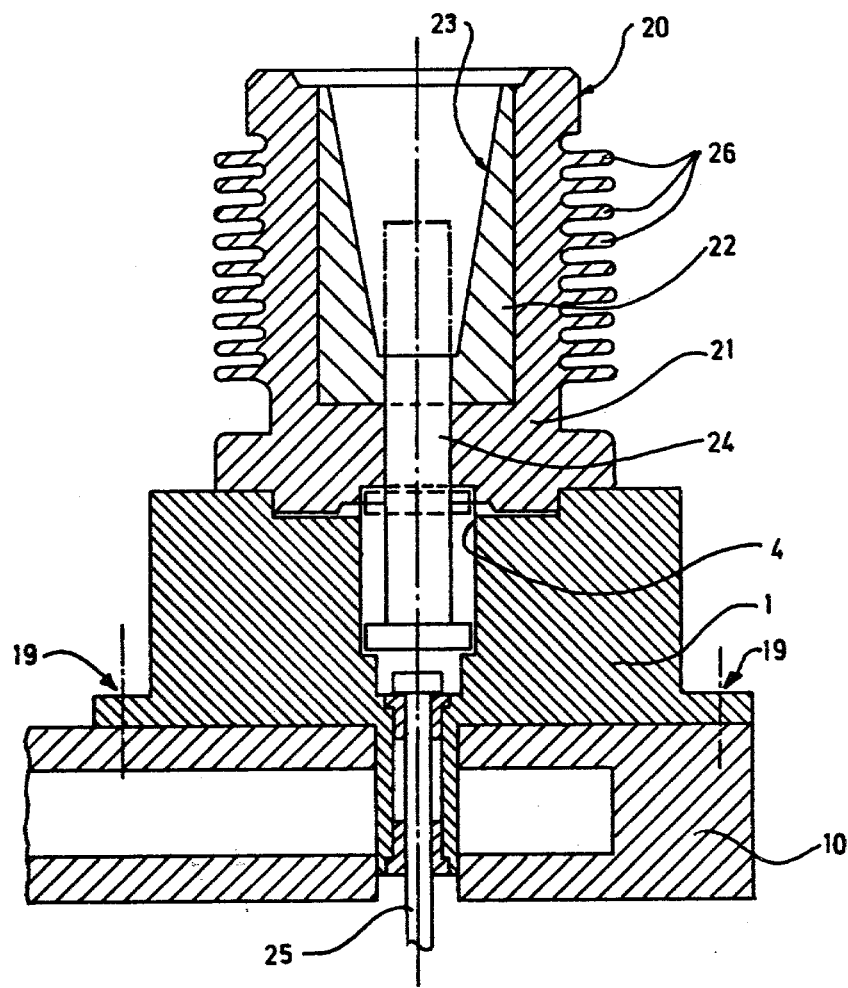
FIG. 5 is a sectional view, along line V—V of FIG. 3 of the adaptor mounting a mold for small articles.

FIG. 5 is a sectional view, along line V—V of FIG. 3 of the adaptor 1 in position on the plate 10 of the press and fixed thereupon by means of screws or bolts secured along the axes 19. The adaptor here uses the supplementary piece 6 (FIG. 3) for alignment of a mold 20 for small articles. The mold is centered on the hole 4. A second identical mold is centered on the hole 3, not represented in this figure. The mold has an outer body 21 and an inner part 22 the internal surface 23 of which reproduces the external shape of the article to be molded. The mold likewise comprises an axial cylinder 24 constituting a part of the bottom of the mold and which is actuated upwardly by the drive rod 25 to dislodge the article from the mold in the stripping operation.

The mass to be cooled being much smaller for small articles than for large articles, the cooling of the bottom of the molds by blowing of a fluid is not provided for in the embodiment shown in FIG. 5. Where cooling is desired, the adaptor will be provided with orifices, similar to the orifices 8 and 9, for admission and outlet of the cooling fluid. In the embodiment of FIG. 5, cooling is simply effected by constructing the outer body 21 with fins 26. The inside bottom of the mold is at the same level as the level of the inside bottom of a mold centered on the central hole 2 of the adaptor.

The stationary adaptor pursuant to the invention facilitates the operation of changing the molds. It secures the precise positioning of the new molds in instantaneous fashion; while in the prior art, as each mold had a given adaptor, it was necessary at each change of mold to effect centering operations that were frequently imprecise. In addition, the bottom level of a mold mounted on an adaptor was never the same as that of the preceding mold, and this required the operator to make a new adjustment of the mold-stripping device for the purpose of securing correct hold of the article. In the embodiment described the drive rods 17 and 25 have an identical travel, which eliminates that operation of adjustment of the stripping devices.

Another feature of the invention concerns the hydraulic control of the pressing devices $P_1$–$P_4$ whereby those of one group can be operated simultaneously or alone or in still other combinations.

Figure 6:
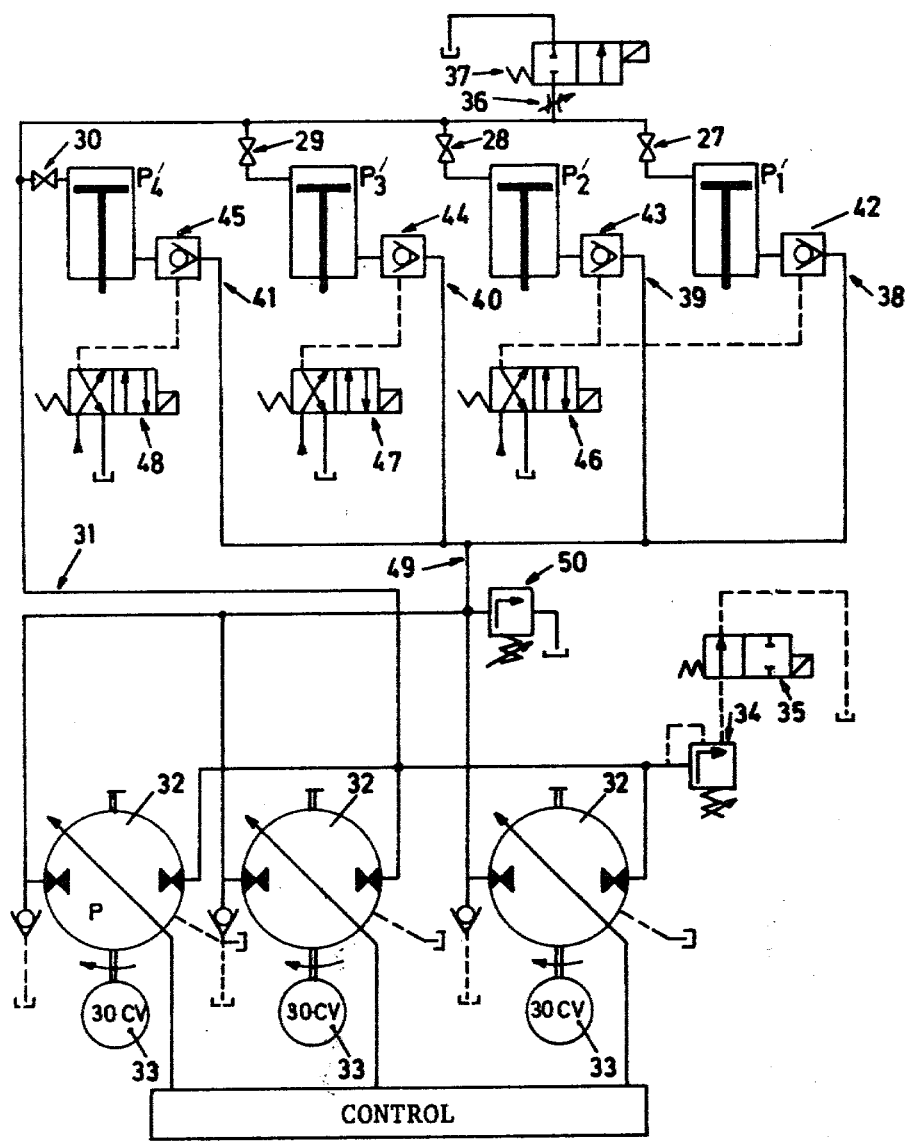
FIG. 6 is a diagram of the hydraulic control circuit of the pressing devices.

FIG. 6 represents a diagram of the hydraulic circuit for control of the motion of the pressing devices. In the embodiment of the invention, each of the pressing devices $P_1$, $P_2$, $P_3$, $P_4$ includes a hydraulic jack $P'_1$, $P'_2$, $P'_3$, $P'_4$. The jacks are part of the hydraulic circuit and each is controlled independently of the other. Generally $P'_1$ and $P'_2$ are actuated simultaneously in the production of small articles on a double parison, while $P'_3$ and $P'_4$ are actuated simultaneously in producing medium-sized articles. For production of a single parison, the jack $P'_3$ or $P'_4$ is actuated alone.

Each of the jacks is put into circuit by means of isolating cocks 27, 28, 29, 30. These cocks isolate the jacks, at the bottom side, from the general supply circuit 31. The general supply circuit 31 is traversed by the hydraulic fluid delivered by three pumps 32. These three pumps are mounted in parallel and are advantageously plunger pumps, which permits them to have a variable delivery. The variation in delivery is effected by inclination of the cylinder, obtained by a control device known per se. Each of the pumps is driven by a motor 33 of sufficient power, for example 25 kilowatts, to furnish a delivery of hydraulic fluid which may be on the order of several hundreds of liters per minute.

To secure the descent of the dies, the three pumps deliver into the general circuit 31, which includes a pressure-limiting device 34 with a two-way electrovalve 35. From the main circuit 31 is branched a line having a delivery-limiting device 36 and a two-way electrovalve 37 whose essential role is to secure, by the opening thereof, decompression of the die at the end of travel in the pressing operation and before the rapid return of the die. From the rod side of each of the dies runs hydraulic conduits 38, 39, 40, 41 each of which includes a non-return valve 42, 43, 44, 45 and from which are branched conduits leading to safety electrovalves 46, 47, 48. The four conduits 38, 39, 40, 41 meet again to form a main conduit 49, which returns to the pumps 32. The main conduit 49 also includes a pressure-limiting device 50.

Another feature of the pressing machine pursuant to the invention concerns the rotation of the molding plate of the machine. Advantageously, rotation is secured by a hydraulic device described now in reference to FIG. 7.

Figure 7:
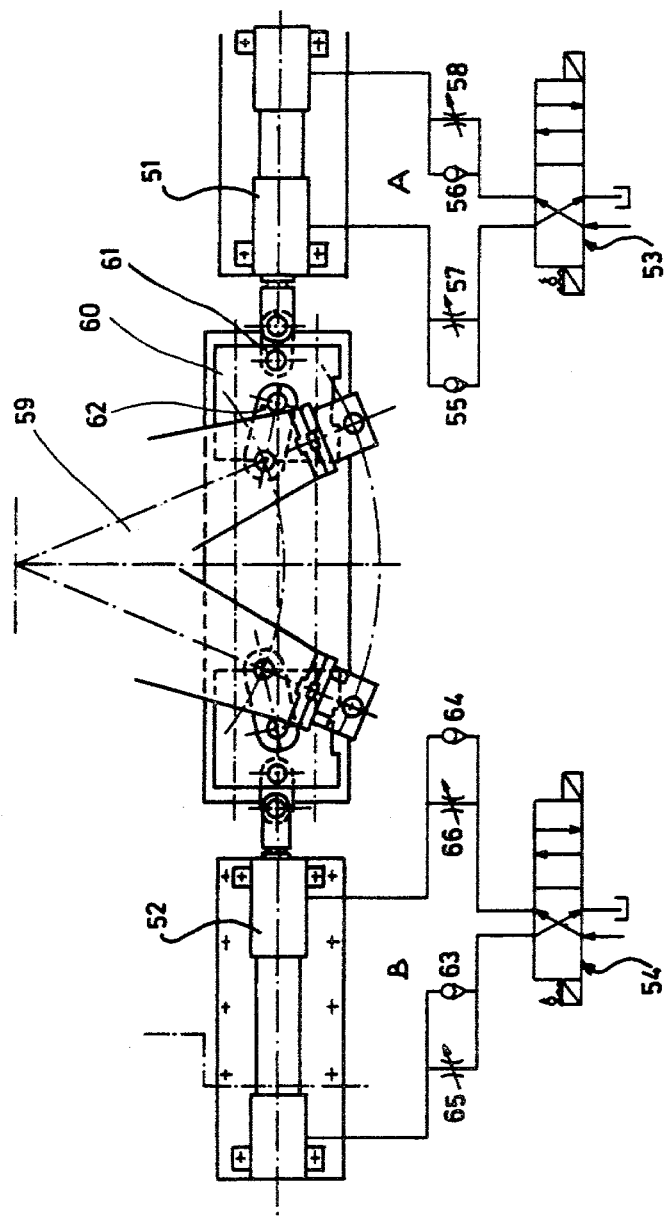
FIG. 7 is a diagram of the hydraulic control circuit for effecting rotation of the molding plate.

FIG. 7 represents a diagram of the circuits of the hydraulic fluid and of the jacks used for securing rotation of the plate from one work station to the next. The whole of the hydraulic mechanism is composed of independent circuits corresponding in number to the number of different advance steps of the plate bearing the molds. Thus, in the embodiment pursuant to the present invention, where the machine comprises two different advance steps (1/16 of a revolution and ⅛ of a revolution), there will be two hydraulic circuits A and B, each of them comprising a jack, 51 and 52, whose travel is determined according to the advance step of the plate. Each hydraulic circuit also includes a distributor, 53 and 54, having two positions. The hydraulic circuit A contains two non-return valves 55 and 56 and two delivery-limiting devices 57 and 58. The jack of circuit A is a jack of the CPOAC super-cushioned type with built-in acceleration and deceleration, manufactured by CPOAC Company. It serves to secure rotation of the plate of the machine in the production of small articles and thus produces advance steps of the plate in increments of 1/16 of a revolution.

The jack 51 is connected to a driving arm 59 of the plate of the machine. The connection is by means of a carriage 60, guided rectilinearly so as to avoid any force on the rod of the jack other than its action on the arm to cause the plate to rotate. The connection between the rod of the jack and the carriage comprises a swivel-joint coupling 61, while a link 62 connects the carriage 60 to the arm 59.

In the example of a machine with 32 small molds operating on a double parison, the rotation between two successive stations is 1/16 of a revolution, the travel of the jack is consequently fixed and may, for example, be comprised between 200 and 300 mm.

The circuit B is put into operation in the double-parison production of medium-sized articles as well as in the single parison production of very large articles where 8 molds are used. The jack 52, which is also of the CPOAC super-cushioned type, must therefore secure a rotation of ⅛ of a revolution and will have a travel double that of the jack 51. To effect rotation, the jack 52 will be connected to the carriage previously disconnected from the jack 51. The connection is similar and is made by a swivel-joint coupling. The circuit B is designed in a fashion similar to the circuit A; it will thus have two non-return valves 63 and 64, as well as two delivery-limiting devices 65 and 66.

The operation of the machine is now described in an example of the production of small articles with 32 molds on a double parison, such as a tumbler about 65 mm in diameter.

In such a production run, the 32 molds are arranged in the 16 adaptors at the rate of two molds per adaptor. The two discharging devices $V_1$ and $V_2$ and the two pressing devices $P_1$ and $P_2$ are put into service. The two isolating cocks 27 and 28 are opened while the cocks 29 and 30 are closed. The dies of the two pressing devices $P_1$ and $P_2$ are in high position. The two molds situated under the dies each contain a parison.

The pressure-limiting device 34 is adjusted to a given pressure and a given quantity of fluid is delivered by means of the pumps into the conduit 31. The fluid is carried in the two branches that run to the bottom side of the two jacks $P'_1$ and $P'_2$. This operation lasts approximately 2/10 to 3/10 of a second and corresponds to the rapid descent of the dies of the pressing devices over a distance of about 150 mm. The delivery of fluid is then reduced by changing the inclination of the cylinders of the pumps, which reduces the speed of the dies and imparts to them a slow speed for the pressing operation which lasts 0.25 second for a die displacement of about 50 mm. The force exerted in the course of pressing is on the order of 1100 kg. The dies are then left in their low position for a period of about 1/10 of a second for glazing of the articles, at the end of which decompression is effected by opening and delivery-limiting device 36 of the decompression circuit. The pump is then caused to deliver in the other direction by first adjusting the pressure-limiting device 50 to a given pressure, for example on the order of 50 bars, while the pressure-limiting device 34 is adjusted to a lower pressure, for example on the order of 5 bars. This produces the rapid ascent of the dies through about 200 mm in a period of about 3/10 of a second. The total duration of the travel of the dies is on the order of 1 second.

During the pressing operation at station IIa, two parisons flow from the two discharging devices $V_1$ and $V_2$ at the station Ia. As soon as the dies of the pressing devices are in high position, the plate is caused to pivot 1/16 of a revolution by operation of the hydraulic circuit A and actuation of the jack 51. Then the pressing operation begins again. At the cooling stations IIIa and XIIa, blowpipes or orifices overhanging the plate of the machine send air over the molds and the molded articles to cool them. When they reach the stripping stations XIIIa, XIVa, the articles are removed from the molds two by two.

The operation of the machine in the case of fabrication of medium-sized articles is generally the same as described above, with the two discharging devices $V_3$ and $V_4$ and the corresponding pressing devices $P_3$ and $P_4$ being put into operation. The molds are cooled in their upper part by air-blowing orifices overhanging the plate but alternatively underneath thanks to the cooling-fluid inlet orifices 8. In the production of hollow plates, for example, the pressing cycle has a duration of about 1.35 seconds, being divided into about 0.25 second of rapid descent corresponding to a distance covered of 150 mm, about 0.50 second of slow descent corresponding to a distance covered of 50 mm for the pressing operation, about 0.2 second for glazing of the article and about 0.3 second for the rapid ascent. The force of pressing is about 13,000 kg.

For operation in the production of large articles on a single parison with 8 or 16 molds, $P_3$ or $P_4$ may be used indifferently with the corresponding discharging devices, but $P_3$ and $V_4$ may likewise be combined in production with 16 molds. The three pressing devices not used are isolated from the general circuit by closing of the corresponding isolating cocks. In the fabrication of a vegetable dish 260 mm in diameter for example, the pressing cycle has a duration on the order of about 3 seconds, being divided into 0.25 second of rapid descent again corresponding to a distance of 150 mm, 2 seconds of slow descent corresponding to a distance of 50 mm during which the pressing operation occurs, about 0.5 second for the glazing, and about 0.3 second for the rapid ascent of the die. The force of pressing is about 7000 kg.

The machine pursuant to the invention produces articles at a rapid rate, for example about 70 to 80 articles in one minute for a tumbler of 65 mm. In the production of medium-sized articles on a double parison, the machine produces for example on the order of 45 plates per minute. In the fabrication of large articles on a single parison, the machine may produce for example on the order of 20 plates 310 mm in diameter in one minute. All of the articles produced are of very good quality and, in particular, are irreproachable in appearance.

The machine pursuant to the invention with a plurality of categories of pressing devices may likewise be used in mixed production.

For example, it is possible to produce a cup and a saucer at the same time. Further, it is likewise possible, by means of an adjusted position of the various pressing and discharging devices, to produce a small article and a medium-sized article simultaneously.

A machine with four pressing devices divided into two groups of two devices each has been described in detail above, but any other machine having a plurality of groups of devices is likewise in accordance with the invention. For example, a machine having 5 pressing devices divided into two devices of one group used for the production of medium-sized or large articles, and three devices of a second group used for the production of small articles, may be provided. In this embodiment, three small molds would be mounted on a single crown which could likewise bear a mold of medium size or one of large size, while the plate would have 2 advance steps; the advance step used in the production of medium-sized articles being double the step used in the production of small articles.

There may likewise be provided a machine pursuant to the invention in which each of the devices of a group of devices will comprise a plurality of dies actuated simultaneously by a single hydraulic jack. Such an embodiment would be particularly suited to the production of small articles.

A machine pursuant to the invention may likewise include pressing and discharging devices distributed on a plurality of imaginary concentric circles above the plate bearing the molds, each pressing device and the corresponding discharging device being situated on a single imaginary circle. One example of such an embodiment would be a machine equipped with adaptors on each of which would be mounted three small molds or one medium-sized or large mold, the three small molds being distributed approximately at the apex of an imaginary equilateral triangle, centered on the axis of the medium-sized mold.

The pressing machine pursuant to the invention is very flexible in use thanks to its universal character. If necessary, a production run of small articles and a run of medium-sized articles can be alternated on the same day, with no loss of time, simply by replacement of the molds. Moreover, the pressing sequence imparts a high rate of production to the machine. Finally, the hydraulic controls provide relatively quiet operation, which limits acoustic nuisances and improves employees' working conditions.

I claim:

1. In a pressing machine for articles of moldable material having a rotatable molding plate, advancing means for rotating the plate in a step-by-step advance movement, means for mounting a plurality of molds on the plate, a plurality of discharging devices and a plurality of pressing devices positioned about the periphery of the plate for respectively placing molten material into each of the molds, and molding the material into articles of the desired shape, the improvement wherein:
    (a) the advancing means includes selectively operable means for advancing the plate through a first series of advance steps of equal distances as measured in terms of a fraction of revolution of the plate and through a second series of advance steps equal to a whole multiple of the distance of the first advance steps;
    (b) the discharging and pressing devices are divided into a plurality of groups, one group including:
        (1) a first set of discharging devices angularly spaced from each other by a distance equal to a fraction of the first advance step,
        (2) a first set of pressing devices angularly spaced from each other by a distance equal to said fraction of the first advance step and spaced, in the direction of advancement of the plate, from the respective ones of the first set of discharging devices by a distance equal to said first advance step,
    and a second group including:
        (1) a second set of discharging devices angularly spaced from each other by a distance equal to said first advance step, with one of the second set thereof being located centrally between the first set of discharging devices and the other of the second set being located centrally of the first set of pressing devices, and
        (2) a second set of pressing devices angularly spaced from each other by a distance equal to said first advance step and angularly spaced in the direction of advancement of the plate from the respective ones of the second set of discharging devices by a distance equal to said second advance step; and
    (c) means for selectively controlling the operation of the discharging and pressing devices independently of each other.

2. Pressing machine according to claim 1, wherein:
    (a) four discharging devices and four pressing devices are distributed into two discharging devices and two pressing devices of a first group and two discharging devices and two pressing devices of a second group.

3. Pressing machine according to claim 2, wherein:
    (a) the second advance steps are double the distance of the first advance steps.

4. Pressing machine according to claim 1, wherein:
    (a) the molding plate supports adaptors for all the molds,
        (i) said adaptors having a plurality of types of mold positioning means, the number of types of the mold positioning means being equal to the number of groups of pressing devices for the molds.

5. Pressing machine according to claim 4, wherein:
    (a) the adaptors together form a circular shape.

6. Pressing machine according to claim 4, wherein:
    (a) two successive adaptors are displaced from one another by a distance equal to the smallest advance step of the plate.

7. Pressing machine according to claim 5, wherein:
    (a) each adaptor has a structure permitting it to mount one large mold or two small molds with the bottom of the large mold at the same level as the bottom of the small molds.

8. Pressing machine according to any one of claims 4–7, wherein:
    (a) the plate holds 16 adaptors which together can support 32 molds, 16 molds or 8 molds regularly distributed.

9. Pressing machine according to claim 8, wherein:
    (a) each adaptor has grooves for centering of the molds.

10. Pressing machine according to any one of claims 1–7, wherein:
    (a) the plate is actuated by a hydraulic mechanism comprising as many jacks as there are different advance steps of the plate.

11. Pressing machine according to claim 10, wherein:
    (a) each of the pressing devices includes at least one die and hydraulic jack for operating the die; and
    (b) the hydraulic jacks controlling the dies belonging to the same group of pressing devices are controlled simultaneously.

12. Pressing machine according to any one of claims 2–7, wherein:
    (a) the second discharging device and the two pressing devices of the first group are displaced from the first discharging device of this group by a distance equal to $2n\,p/4$ of a revolution of the plate;
    (b) the two pressing devices are displaced from their corresponding discharging devices by a distance equal to $mp$ of a revolution of the plate;

(c) the two discharging devices and the two pressing devices of the second group are displaced from the first discharging device of the first group by a distance equal to (4n+1) p/4 of a revolution of the plate; and (d) the two pressing devices of the second group are displaced from their corresponding discharging devices by a distance equal to 2 qp of a revolution of the plate, with p being the smallest advance step of the plate n being a whole number m and q being a whole number preferably equal to 1.

13. Pressing machine according to claim 12, wherein:

(a) two discharging devices ($V_1$, $V_2$) and two corresponding pressing devices ($P_1$, $P_2$), displaced by 1/16 of a revolution from the two discharging devices ($V_1$, $V_2$) are included in the first group for use in the production of small articles;

(b) two discharging devices ($V_3$, $V_4$) and two corresponding pressing devices ($P_3$, $P_4$), displaced by ⅛ of a revolution from the two discharging devices ($V_3$, $V_4$) are included in the second group for use in the production of medium-sized and large articles; and (c) one of the two discharging devices ($V_3$) of the second group is situated in the plane of symmetry of the two discharging devices ($V_1$, $V_2$) of the first group, while the second discharging devices ($V_4$) of the second group is displaced by 1/16 of a revolution with respect to the discharging device $V_3$.

14. Pressing machine according to any one of claims 1-7, wherein:

(a) stripping devices are distributed about the periphery of the plate for removing finished articles from the molds; and (b) the stripping devices include drive rods of the like travel for actuating the stripping devices.

15. Pressing machine according to any one of claims 1-7, wherein:

(a) the pressing means includes a hydraulic control circuit for effecting travel of the dies during formation of the article in the following sequence:

rapid and controlled descent of the die, slow and controlled descent during the actual pressing operation, holding of the die under pressure in low position in the mold for a given time called glazing, holding of the die during decompression in low position in the mold, and rapid and controlled ascent of the die.

16. In the process for pressing articles of moldable material by the action of one or a plurality of hydraulically controlled dies on the raw material, specifically one or a plurality of parisons in one or a plurality of molds, the improvement wherein the travel of each of the dies has the following sequential steps:

(a) rapid and controlled descent of the die;

(b) slow and controlled descent during the pressing operation;

(c) holding of the die under pressure in low position in the mold for a given time;

(d) decompressing the hydraulic control for the die while the die is in the low position in the mold;

(e) holding of the die during decompression in low position in the mold; and (f) rapid and controlled ascent of the die.

17. In a pressing machine for articles of moldable material having a rotatable molding plate, advancing means for rotating the plate in a step-by-step advance movement, means for mounting a plurality of molds on the plate, a plurality of discharging devices and a plurality of pressing devices positioned about the periphery of the plate for respectively placing molten material into each of the molds, and molding the material into articles of the desired shape, the improvement wherein:

(a) the advancing means includes selectively operable means for advancing the plate through a first series of advance steps of equal distances as measured in terms of a fraction of revolution of the plate and through a second series of advance steps equal to twice the distance of the first advance steps;

(b) the discharging and pressing devices are divided into a plurality of groups, one group including:

(1) a first pair of discharging devices ($V_1$,$V_2$) angularly spaced from each other by a distance equal to one-half the first advance step, (2) a first pair of pressing devices ($P_1$,$P_2$) angularly spaced from each other by a distance equal to one-half of the first advance step and spaced, in the direction of advancement of the plate, from the respective ones of the first pair of discharging devices by a distance equal to said first advance step, and the second group including:

(1) a second pair of discharging devices ($V_3$,$V_4$) angularly spaced from each other by a distance equal to said first advance step, with one of the second pair thereof being located centrally between the first pair of discharging devices and the other of the second pair being located centrally between the first pair of pressing devices, and (2) a second pair of pressing devices ($P_3$,$P_4$) angularly spaced from each other by a distance equal to said first advance step and angularly spaced in the direction of advancement of the plate from the respective ones of the second pair of discharging devices by a distance equal to said second advance step; and (c) means for selectively controlling the operation of the discharging and pressing devices independently of each other.

* * * * *